(12) United States Patent
Doolittle et al.

(10) Patent No.: US 8,671,614 B1
(45) Date of Patent: Mar. 18, 2014

(54) INJECTION TIP FOR USE WITH AN INJECTOR FOR INJECTING LIQUID CHEMICAL INTO A TREE

(71) Applicants: Glayne Doolittle, Omaha, NE (US); Michael J. Frisina, Omaha, NE (US)

(72) Inventors: Glayne Doolittle, Omaha, NE (US); Michael J. Frisina, Omaha, NE (US)

(\*) Notice: Subject to any disclaimer, the term of this patent is extended or adjusted under 35 U.S.C. 154(b) by 0 days.

(21) Appl. No.: 13/835,573

(22) Filed: Mar. 15, 2013

Related U.S. Application Data

(63) Continuation-in-part of application No. 13/136,906, filed on Aug. 15, 2011.

(51) Int. Cl.
*A47G 7/06* (2006.01)

(52) U.S. Cl.
USPC ............................................ 47/57.5

(58) Field of Classification Search
USPC ............................................ 47/57.5
See application file for complete search history.

(56) References Cited

U.S. PATENT DOCUMENTS

| | | | |
|---|---|---|---|
| 2,116,591 A | 11/1937 | Barber | |
| 3,304,655 A | 7/1965 | Mauget | |
| 3,608,239 A | 12/1968 | Tucker | |
| 5,046,281 A | 9/1991 | Murphy | |
| 5,239,773 A * | 8/1993 | Doolittle, Jr. | 47/57.5 |
| 5,797,215 A | 8/1998 | Doolittle et al. | |
| 7,178,286 B1 * | 2/2007 | Doolittle | 47/57.5 |
| 2002/0046486 A1 * | 4/2002 | Wild et al. | 47/57.5 |
| 2005/0166450 A1 * | 8/2005 | Wild et al. | 47/57.5 |

\* cited by examiner

*Primary Examiner* — Frank T Palo
(74) *Attorney, Agent, or Firm* — Dennis L. Thomte; Thomte Patent Law Office LLC

(57) ABSTRACT

An injection tip for use with an injector for injecting liquid chemical into a tree such as a palm tree which includes a body portion, a needle and a point member mounted on the forward end of the needle. The needle has liquid ejector holes formed therein adjacent the forward end thereof.

8 Claims, 2 Drawing Sheets

INJECTION TIP FOR USE WITH AN INJECTOR FOR INJECTING LIQUID CHEMICAL INTO A TREE

CROSS REFERENCE TO RELATED APPLICATION

This is a Continuation-In-Part of application Ser. No. 13/136,906, filed Aug. 15, 2011, entitled AN INJECTION TIP FOR USE WITH AN INJECTOR FOR INJECTING LIQUID CHEMICAL INTO A TREE.

BACKGROUND OF THE INVENTION

1. Field of the Invention

This invention relates to an injection tip for use with an injector for injecting liquid chemical into a tree. More particularly, this invention relates to an injector tip for use with an injector for injecting liquid chemical into a palm tree. Even more particularly, this invention relates to an injection tip which prevents the liquid ejector holes formed therein from becoming plugged during insertion of the needle of the injection tip into the tree and which prevents the liquid ejector holes formed in the needle from becoming plugged during the extraction of the needle from the tree.

2. Description of the Related Art

Tree injection is the operation of making a cut in a tree and then placing a dose of liquid chemical into the cut. There are several known methods by which this operation may be done. Generally, a cut is made manually by means of an ax or other such hand tool. The cut must be of such a shape and angle as to allow the introduced chemical to remain in the cut while the tree absorbs and transports the chemical throughout the tree. To efficiently accomplish this operation, the cut must be of sufficient size to accommodate the chemical injector. This often results in damage being done to the tree itself, which is acceptable if the goal is to eventually kill the tree, but completely unacceptable if the goal is to improve the health of the tree.

Furthermore, many of the prior art methods of tree injection involve a two-step operation which can be time consuming and involve considerable manual effort. Also, as the operation involves two steps, there is a delay between making the cut into the tree and introducing the chemical to the cut, which is critical as trees have the ability to quickly heal up incisions protecting them from entry of bacteria or other such harmful organisms.

An example of the prior art which attempts to address these problems is Murphy, U.S. Pat. No. 5,046,281, which discloses an attachment for a handgun with a moveable piston to which is attached a blade to form a cut in a tree, and a fluid injection means which instantaneously supplies a fluid dosage to the cut. The fuel to operate the handgun, together with the fluid to be applied to the cut, are preferably provided in a backpack. While this invention applies liquid instantaneously when the cut is formed the problem is that the cut is formed by a blade being thrust into the tree thus opening a large hole and causing damage to the surrounding tree tissue. Furthermore, to operate the apparatus, an operator must carry a backpack which holds the fuel and fluid to be injected. This situation does not present a problem when an operator is injecting one tree a day, but on such places as tree farms, an operator may inject hundreds or thousands of trees in a day, involving considerable walking and bending. Carrying such a backpack can result in various degrees of back and leg strain, due to the additional weight thereof. There is therefore a need for a relatively lightweight tree injection apparatus which can inject trees while causing a minimum of damage to the tree tissue.

Other examples of the prior art have used other means of injecting plants, such as needles or the like. Examples of such art are found in Mauget, U.S. Pat. No. 3,304,655, and Barber, U.S. Pat. No. 2,116,591; both disclose injection systems having a needle. However, the problem encountered in utilizing both examples of the prior art is that before the needle may be inserted into a tree, a hole must be formed in the tree, or the needle will be plugged by tree fiber when it is inserted. Generally, at least a ⅛-inch hole needs to be drilled in the tree to insert the needles of the above inventions, which causes a great deal of damage to a tree, which is not a good way to save a tree. Moreover, both of these examples require a two-step operation to achieve injection of a tree.

Finally, one other example of the prior art which addresses this problem is Tucker, U.S. Pat. No. 3,608,239, which discloses a tree killing poison injector nozzle comprising a tube having a wedge-shaped end portion for entering a cut formed in a tree. The opposing sides of the wedge-shaped end are cut away to define an opening at each of its sides. A poison directing guard, surrounding the tube, forms laterally open channels lying in the plane of the wedge-shaped end. Once again, however, such an injection system is fine for use if the goal is to kill the tree. If the goal is to improve the health of the tree, however, use of the Tucker invention surely will not achieve the desired end. Furthermore, the cut formed by use of the Tucker device is much larger than is desirable to prevent harm to the tree. Finally, fluid is released from nozzles a substantial distance behind the tree cutting edge, thus resulting in a deeper cut having to be made, causing more damage to the tree.

Applicant's earlier patent, U.S. Pat. No. 5,239,773, solved many of the problems associated with the prior art tree injection systems. It has been found that it would be advantageous if the injection tip and needle thereon could be left in the tree, after the liquid chemical is injected into the tree, until such time as the liquid chemical has been absorbed by the tree and that it would also be advantageous if the person performing the injection method could readily determine if the liquid chemical had been absorbed by the tree prior to removing the injection tip and needle from the tree.

In Applicant's U.S. Pat. No. 5,797,215, the needle of the injection tip shown therein has at least one liquid ejector hole formed therein. In Applicant's U.S. Pat. No. 7,178,286, the needle of the injection tip shown therein has a plurality of liquid ejector holes formed therein. In Applicant's co-pending application, a wedge-shaped needle is disclosed which has a single liquid ejector hole formed therein. The co-pending application also discloses a spring-loaded valve assembly mounted in the hub or body portion of the injection tip.

Although the injection tips in Applicant's prior patents and co-pending application work satisfactorily in most trees, the liquid ejector holes formed in the needles thereof tend to become plugged when the needles are inserted into palm trees. The problem is even more prevalent when the needles are withdrawn from the trunk of a palm tree due to the husk, cortex or bark of the palm tree. If the liquid ejector holes become plugged during the withdrawal of the needle from the palm tree, it is practically impossible to unplug the liquid ejector holes which prevents the needles from being used again. The nature of the husk, cortex or bark of the palm tree also makes it difficult to insert the needles into the palm tree.

SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

An injection tip is disclosed for use with an injector for injecting liquid chemical into a tree. The injection tip of this invention includes a hub or body portion having forward and rearward ends with the rearward end of the body portion configured to be selectively removably secured to the injector. An elongated needle, having forward and rearward ends, extends forwardly from the forward end body portion of the injection tip. The needle has a plurality of spaced-apart liquid ejector holes formed therein adjacent the forward end of the needle. The needle has a liquid passageway formed therein which extends therethrough and which has forward and rearward ends. The liquid passageway in the needle communicates with the liquid ejector holes.

A generally bullet-shaped point member, having rearward and forward ends, is secured to the forward end of the needle. The point member has a portion thereof rearwardly of the forward end thereof which has a larger diameter than the diameter of the needle.

The point member on the needle allows the needle to penetrate the husk, cortex or bark of the palm tree in a much easier fashion. The fact that the portion of the point member that has a larger diameter than the diameter of the needle creates a low pressure zone adjacent the liquid ejector holes since they are positioned on the smaller diameter needle. The result is that the liquid ejector holes do not plug during the insertion of the needle into the palm tree or the withdrawal of the needle from the palm tree.

In the preferred embodiment, the liquid ejector holes are counter-sunk holes.

It is therefore a principal object of the invention to provide an improved injection tip for use with an injector for injecting liquid chemical directly into the trunk of a tree such as a palm tree.

A further object of the invention is to provide a needle for an injection tip which prevents the liquid ejector holes of the needle from becoming plugged.

A further object of the invention is to provide an injection tip wherein a point member is secured to the forward end of the needle of the injection tip with the point member having a larger diameter than the diameter of the needle so that a low pressure zone is created adjacent the ejector holes to prevent the plugging thereof.

These and other objects will be apparent to those skilled in the art.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DESCRIPTION OF THE PREFERRED EMBODIMENT

Figure 1:
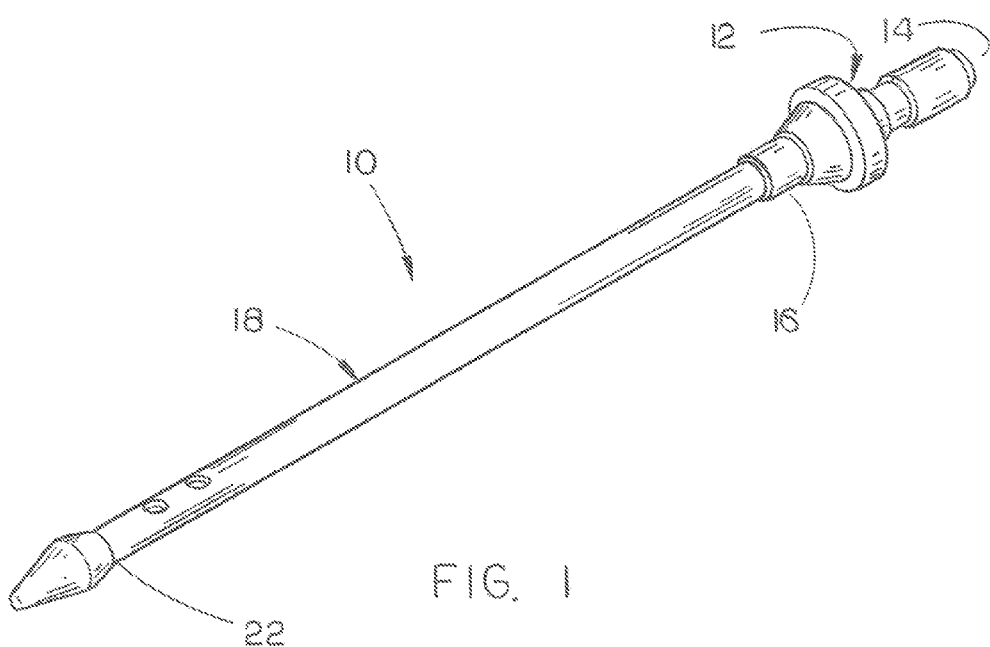
FIG. 1 is a perspective view of the injection tip of this invention.

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense in that the scope of the present invention is defined only by the appended claims.

The injection tip of this invention is referred to by the reference numeral 10. Injection tip 10 is designed to be used with a chemical injector device such as manufactured and sold by ArborSystems of Omaha, Nebr. The injector device is fully described in the co-pending application, Ser. No. 13/136,906, filed Aug. 15, 2011, entitled AN INJECTION TIP FOR USE WITH AN INJECTOR FOR INJECTING LIQUID CHEMICAL INTO A TREE, the disclosure of which is incorporated by reference thereto to complete this disclosure if necessary.

Injection tip 10 includes a hub or body portion 12 which is identical to the body portion 56 of injection tip 54 described and shown in the co-pending application. Body portion 12 of this invention is designed to be quick-coupled to the injector of the co-pending application. Body portion 12 has a rearward end 14 and a forward end 16 and has a length of approximately one inch.

Injection tip 10 also includes an elongated hollow needle 18 having a rearward end 20 and a forward end 22. Needle 18 has a passageway 24 extending therethrough. The rearward end 20 of needle 18 is secured to the forward end 16 of body portion 12 by any suitable means. Needle 18 has a pair of spaced-apart counter-sunk liquid ejector holes 26 and 28 formed therein which extend into needle 18 and which communicate with passageway 24 adjacent end 22 of needle 18. Needle 18 also has a pair of spaced-apart counter-sunk liquid ejector holes 30 and 32 formed therein which extend into needle 18 and which communicate with passageway 24 adjacent end 22 of needle 18. Liquid ejector holes 26 and 28 are radially spaced 180 degrees from liquid ejector holes 30 and 32. Needle 18 preferably has a length of about three inches.

Figure 4:
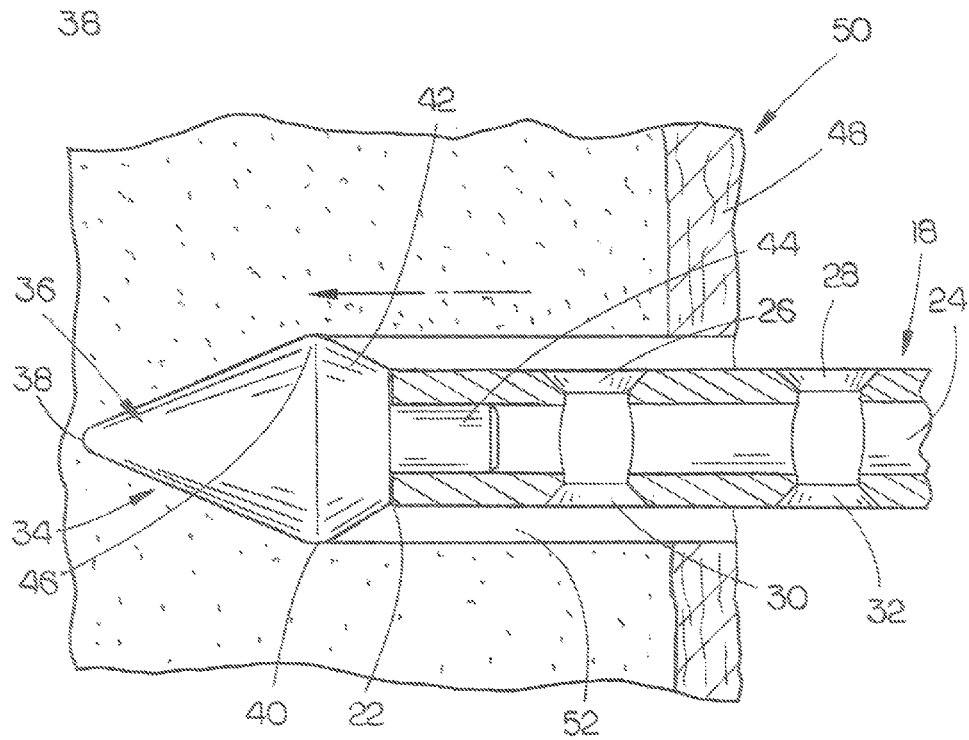
FIG. 4 is a partial sectional view illustrating the needle of the injection tip being inserted into a palm tree.

Needle 18 has a generally bullet-shaped point member 34 secured to the forward end 22 thereof. Point member 34 includes a generally conical-shaped portion 34 having a forward end 38 and a rearward end 40. Point member 34 also includes a truncated conical-shaped or boat-tail shaped portion 42 which extends inwardly and rearwardly from the rearward end 40 of portion 34. Point member 34 also includes a cylindrical portion 44 which extends rearwardly from the rearward end of portion 42. Cylindrical portion 44 is received by the forward end of passageway 24 and is secured to needle 18 by any convenient means. As best seen in FIG. 4, the juncture of portions 36 and 42 have a greater diameter than the diameter of needle 18. That juncture will be designated by the reference numeral 46 for purposes of description.

Figure 2:
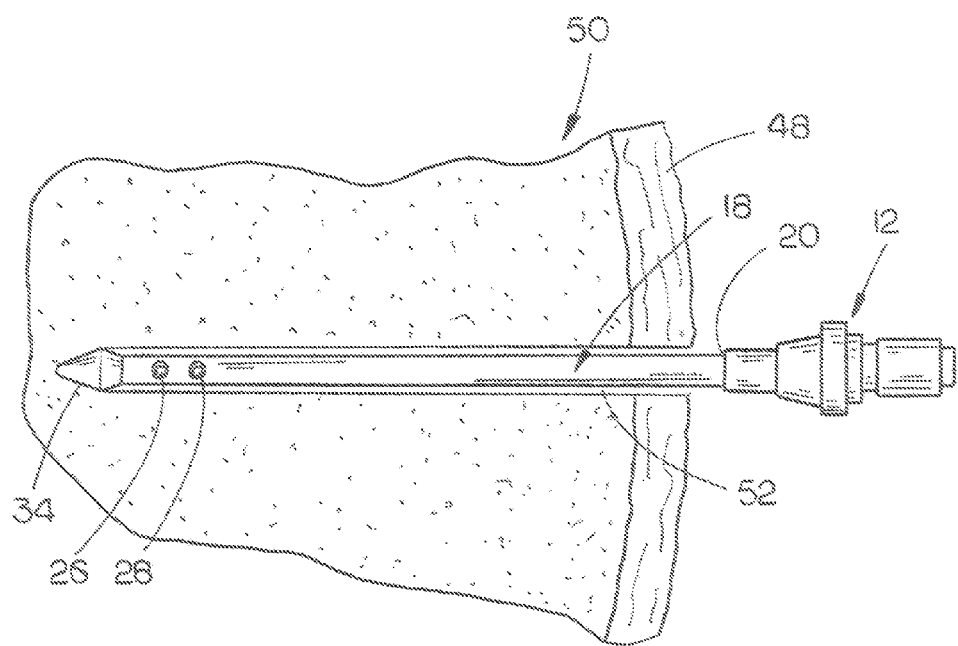
FIG. 2 is a side view illustrating the injection tip of this invention being inserted into a palm tree.
Figure 3:
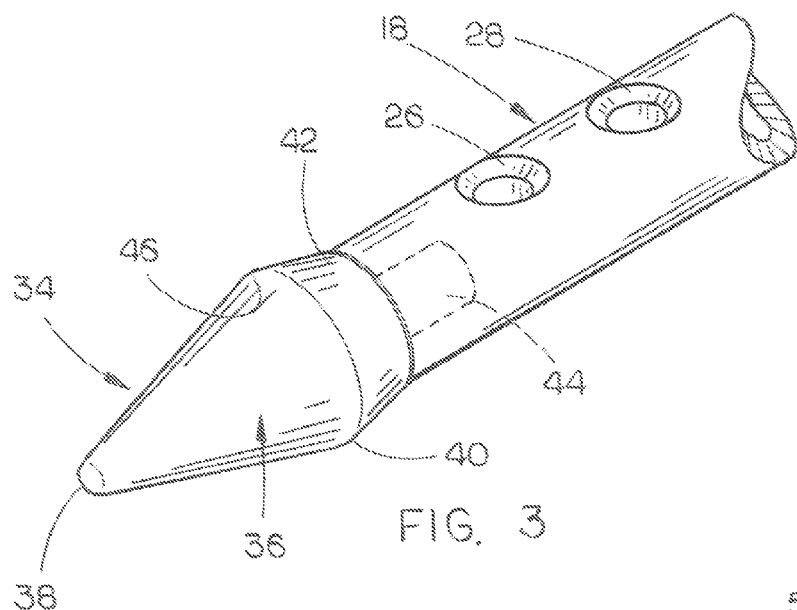
FIG. 3 is a partial perspective view of the needle and the point member thereon.

The injection tip 10 is used as follows. Body portion 12 will be initially disconnected from the injector as described in the co-pending application. The needle 18 of the injection tip 10 is driven through the husk, cortex or bark 48 of a palm tree 50 into the interior of the tree 50 as seen in FIGS. 2 and 4. As needle 18 is driven into the tree 50, the pointed shape of the point member 34 enables the husk, cortex or bark 48 to be penetrated. As the point member 34 is driven into the tree 50, the enlarged diameter 46 of the point member 34 creates a bore 52 which has a diameter greater than the diameter of needle 18 to create a low pressure area adjacent the liquid ejector holes 26, 28, 30 and 32 which prevents the liquid ejector holes 26, 28, 30 and 32 from becoming plugged. The needle 18 is inserted fully into the tree 50 as seen in FIG. 2. The injector is then coupled to body portion 12 and the liquid chemical is injected into the tree, as explained in detail in the co-pending application. When the liquid chemical has been injected into the tree 50, the injector is disconnected from the body portion 12. When the liquid chemical has been injected into the tree, the needle 18 is withdrawn from the tree.

The same low pressure area is also present as the needle 18 is withdrawn from the tree. The counter-sunk shape of the liquid ejector holes 26, 28, 30 and 32 also aids in preventing the plugging of the liquid ejector holes 26, 28, 30 and 32.

Thus it can be seen that the invention accomplishes at least all of its stated objectives.

Although the invention has been described in language that is specific to certain structures and methodological steps, it is to be understood that the invention defined in the appended claims is not necessarily limited to the specific structures and/or steps described. Rather, the specific aspects and steps are described as forms of implementing the claimed invention. Since many embodiments of the invention can be practiced without departing from the spirit and scope of the invention, the invention resides in the claims hereinafter appended.

The invention claimed is:

1. An injection tip for use with an injector for injecting liquid chemical directly into the trunk of a tree, comprising:
   a body portion having forward and rearward ends;
   said rearward end of said body portion configured to be selectively removably secured to the injector;
   an elongated needle, having forward and rearward ends, extending forwardly from said forward end of said body portion;
   said needle having a plurality of spaced-apart liquid ejector holes formed therein adjacent said forward end of said needle;
   said needle having a liquid passageway formed therein extending there through which has forward and rearward ends;
   said liquid passageway communicating with said liquid ejector holes;
   a generally bullet-shaped point member, having rearward and forward ends, secured to said forward end of said needle;
   said point member having a portion thereof rearwardly of said forward end of said point member which has a larger diameter than the diameter of said needle.

2. The injection tip of claim 1 wherein said generally bullet-shaped point member includes a forward generally conical-shaped portion having a forward end and a rearward end, a boat-tail portion having forward and rearward ends which extends rearwardly and inwardly from said rearward end of said generally conical-shaped portion, and a cylindrical portion, having forward and rearward ends, extending rearwardly from said rearward end of said boat tail portion with the rearward end of said cylindrical portion being received by and secured to said forward end of said needle.

3. The injection tip of claim 2 wherein the juncture of said rearward end of said generally conical-shaped portion and said forward end of said boat tail portion has a diameter greater than the diameter of said needle.

4. The injection tip of claim 1 wherein each of said chemical discharge holes comprise counter-sunk holes.

5. The injection tip of claim 3 wherein each of said chemical discharge holes comprise counter-sunk holes.

6. An injection tip for use with an injector for injecting liquid chemical directly into the trunk of a tree, comprising:
   a body portion having forward and rearward ends;
   said rearward end of said body portion configured to be selectively removably secured to the injector;
   an elongated needle, having forward and rearward ends, extends forwardly from said forward end of said body portion;
   said needle having a plurality of spaced-apart liquid ejector holes formed therein adjacent said forward end of said needle;
   said needle having a liquid passageway formed therein extending therethrough which has forward and rearward ends;
   said liquid passageway communicating with said liquid ejector holes;
   and a point member at said forward end of said needle;
   said tip point member having a portion thereof which has a greater diameter than the diameter of said needle.

7. The injector tip of claim 6 wherein said liquid ejector holes comprise counter-sunk holes.

8. An injection tip for use with an injector for injecting liquid chemical directly into the trunk of a tree, comprising:
   a body portion having forward and rearward ends;
   said rearward end of said body portion configured to be selectively removably secured to the injector;
   an elongated needle, having forward and rearward ends, extends forwardly from said forward end of said body portion;
   said needle having a plurality of spaced-apart liquid ejector holes formed therein adjacent said forward end of said needle;
   said needle having a liquid passageway formed therein extending therethrough which has forward and rearward ends;
   said liquid passageway communicating with said liquid ejector holes;
   said liquid ejector holes comprising counter-sunk holes.

* * * * *